(12) United States Patent
Ishino et al.

(10) Patent No.: US 10,405,682 B2
(45) Date of Patent: Sep. 10, 2019

(54) ORDERED FOOD AND DRINK CONVEYING APPARATUS

(71) Applicant: Ishino Seisakusho Co., Ltd., Ishikawa (JP)

(72) Inventors: Haruki Ishino, Ishikawa (JP); Takehiro Kawaguchi, Ishikawa (JP); Shigeru Kubo, Ishikawa (JP)

(73) Assignee: Ishino Seisakusho Co., Ltd., Ishikawa (JP)

( * ) Notice: Subject to any disclaimer, the term of this patent is extended or adjusted under 35 U.S.C. 154(b) by 0 days.

(21) Appl. No.: 15/572,842

(22) PCT Filed: Jun. 21, 2017

(86) PCT No.: PCT/JP2017/022865
§ 371 (c)(1),
(2) Date: Nov. 9, 2017

(87) PCT Pub. No.: WO2018/037692
PCT Pub. Date: Mar. 1, 2018

(65) Prior Publication Data
US 2018/0279817 A1 Oct. 4, 2018

(30) Foreign Application Priority Data
Aug. 25, 2016 (JP) .................. 2016-164289

(51) Int. Cl.
*A47G 23/08* (2006.01)
*B65G 15/12* (2006.01)
(Continued)

(52) U.S. Cl.
CPC .............. *A47G 23/08* (2013.01); *A47F 10/06* (2013.01); *B65G 15/12* (2013.01); *B65G 15/20* (2013.01)

(58) Field of Classification Search
CPC ......... A47G 23/08; B65G 15/20; B65G 15/22
See application file for complete search history.

(56) References Cited

U.S. PATENT DOCUMENTS

| 4,676,361 A * | 6/1987 | Heisler .............. B65G 47/2445 198/394 |
| 2006/0011417 A1* | 1/2006 | Chen ....................... A47F 10/06 186/39 |
| 2013/0126313 A1 | 5/2013 | Koyama |

FOREIGN PATENT DOCUMENTS

| CN | 103584663 A | 2/2014 |
| GB | 2434569 B | 1/2008 |

(Continued)

OTHER PUBLICATIONS

Search Report in International Application No. PCT/JP2017/022865 dated Sep. 26, 2017, 3 pages (Japanese version).
(Continued)

*Primary Examiner* — Mark J Beauchaine
(74) *Attorney, Agent, or Firm* — Marshall, Gerstein & Borun LLP

(57) ABSTRACT

The present application discloses an ordered food and drink conveying apparatus capable of restricting an exclusive area and improving conveyance efficiency while enabling conveyance of large and small dishes or trays having various sizes. The ordered food and drink conveying apparatus disclosed by the present application includes: a plurality of conveyors being arranged in a side-by-side relationship and conveying foods and drinks to customer seats from a kitchen; and a controller controlling motions of the plurality of conveyors, synchronizing the motions of the plurality of conveyors in a first mode selected when there are foods and drinks being so placed as to straddle the plurality of conveyors, and asynchronizing the motions of the plurality of conveyors in a second mode selected when there are none of (Continued)

the foods and the drinks being so placed as to straddle the plurality of conveyors.

2 Claims, 5 Drawing Sheets

(51) Int. Cl.
*A47F 10/06* (2006.01)
*B65G 15/20* (2006.01)

(56) References Cited

FOREIGN PATENT DOCUMENTS

| JP | 11-164764 | 6/1999 | | |
|----|-----------|--------|---|---|
| JP | 2005-185326 | 7/2005 | | |
| JP | 2008-099885 | 5/2008 | | |
| JP | 2011-234880 | 11/2011 | | |
| JP | 2011-234880 A1 * | 11/2011 | ............. | A47G 23/08 |
| JP | 2013-103839 | 5/2013 | | |

OTHER PUBLICATIONS

Official action in AU Application No. 2017258958 dated May 25, 2018, 5 pages.
First Office Action for Chinese Application No. 201780001598.8, dated Jul. 16, 2019. (15 pages).

* cited by examiner

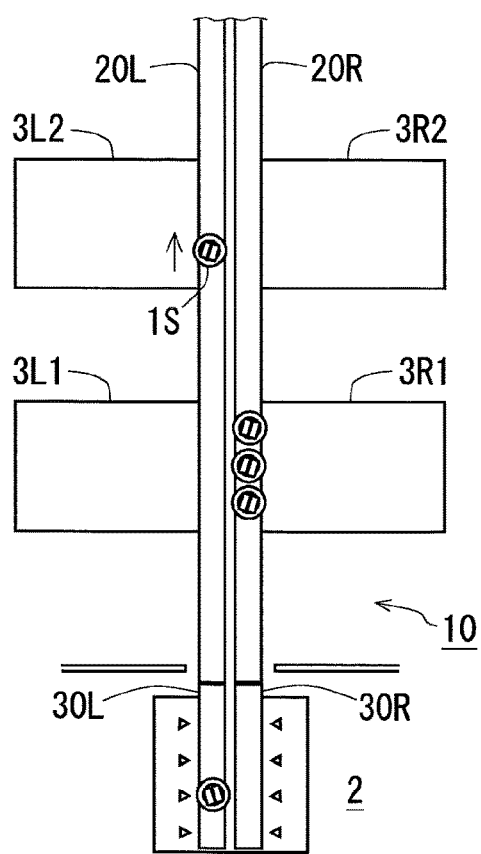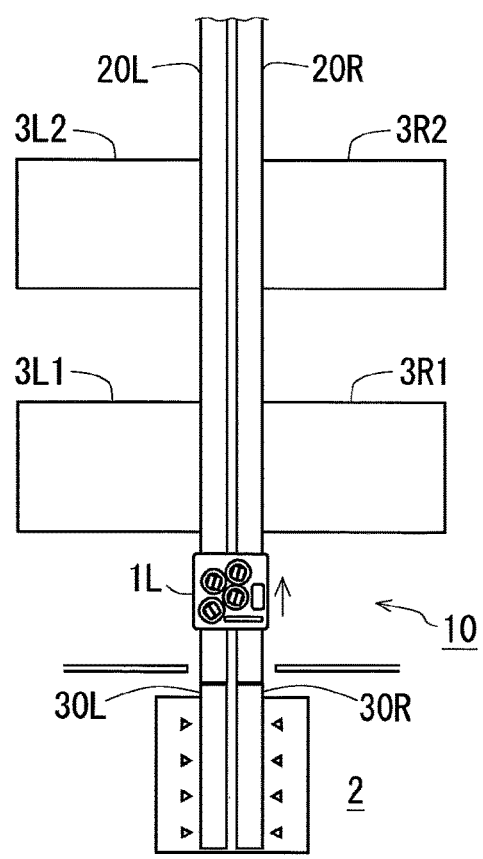

ns and a mode for asynchronizing the motions thereof as a function of a controller that controls operations of a plurality of conveyors arranged in a side-by-side relationship.

ORDERED FOOD AND DRINK CONVEYING APPARATUS

CROSS REFERENCE TO RELATED APPLICATIONS

This application claims priority to Japanese Patent Application No. 2016-164289 filed on Aug. 25, 2016, the entire contents of which are incorporated by reference herein.

TECHNICAL FIELD

The present invention pertains to an ordered food and drink conveying apparatus.

BACKGROUND ART

Over the recent years, restaurants have been providing foods and drinks by use of conveying apparatuses (refer to, e.g., Patent documents 1-3).

DOCUMENTS OF PRIOR ARTS

Patent Document

[Patent document 1] Japanese Patent Application Laid-Open Publication No. 2005-185326
[Patent document 2] Japanese Patent Application Laid-Open Publication No. 2008-099885
[Patent document 3] Japanese Patent Application Laid-Open Publication No. H11-164764

SUMMARY OF THE INVENTION

Problems to be Solved by the Invention

Exemplified as apparatuses that convey ordered foods and drinks to customer seats from a kitchen are a circulation type conveying apparatus to circulate the foods and drinks between the kitchen and the customer seats, and a non-circulation type conveying apparatus to convey the foods and the drinks to the customer seats from the kitchen in a one-way manner. Each of these conveying apparatuses includes a conveying path having a breadth adjusted to a size of a dish or a tray on which to place the food and the drink to be conveyed. Hence, when desiring to convey foods and drinks by using large and small dishes or trays having various sizes, for example, it follows that a conveying path having a relatively large breadth is provided.

However, when a conveying apparatus including the conveying path having the relatively large breadth is provided at a store often using the small dishes for conveying the foods and the drinks, a space for the conveying apparatus becomes futile, resulting in inability of effectively utilizing an area within a limited space of store. When the customer seats are provided on both sides of the conveying path, the conveyance efficiency decreases as far as being unable to simultaneously convey the foods and the drinks to the customer seats on one side and to the customer seats on the other side.

Under such circumstances, the present application discloses an ordered food and drink conveying apparatus capable of restricting an exclusive area and improving conveyance efficiency while enabling conveyance of large and small dishes or trays having various sizes.

Means for Solving the Problems

To solve the problems described above, the present invention prepares a mode for synchronizing motions of convey- Specifically, an ordered food and drink conveying apparatus disclosed by the present application includes: a plurality of conveyors being arranged in a side-by-side relationship and conveying foods and drinks to customer seats from a kitchen; and a controller controlling motions of the plurality of conveyors, synchronizing the motions of the plurality of conveyors in a first mode selected when there are foods and drinks being so placed as to straddle the plurality of conveyors, and asynchronizing the motions of the plurality of conveyors in a second mode selected when there are none of the foods and the drinks being so placed as to straddle the plurality of conveyors.

The thus-configured ordered food and drink conveying apparatus is capable of synchronizing or asynchronizing the motions of the respective conveyors corresponding to the mode to be selected, and is thereby enabled to convey the foods and the drinks on a dish or a tray having a size large enough not to be placed on one conveyor when selecting, e.g., the first mode without installing a conveyor having a large breadth. When selecting the second mode, it is feasible to simultaneously convey the foods and the drinks to a variety of conveying target places by the respective conveyors. The thus-configured ordered food and drink conveying apparatus is therefore capable of restricting the exclusive area and improving the conveyance efficiency while enabling the conveyance of the large and small dishes or trays having the various sizes.

It is to be noted that the controller may control the motions of the plurality of conveyors, based on any one of the first mode and the second mode selected via an operation means installed at a kitchen. With the ordered food and drink conveying apparatus being equipped with the controller such as this, a staff member at the kitchen is able to switch over the mode with his or her own intention.

The controller may control the motions of the plurality of conveyors, based on any one of the first mode and the second mode selected corresponding to outputs of sensors detecting placement states of the foods and the drinks being placed on the plurality of conveyors. In this case, the sensors may detect existence or non-existence of objects straddling the plurality of conveyors, and the controller may control the motions of the plurality of conveyors, based on the first mode, when the sensors detect the objects straddling the plurality of conveyors, and may control the motions of the plurality of conveyors, based on the second mode, when the sensors detect none of the objects straddling the plurality of conveyors. With the ordered food and drink conveying apparatus being equipped with the controller such as this, the mode corresponding to the conveying object is automatically selectable even when the staff member at the kitchen does not operate to switch over the mode.

Effects of the Invention

The ordered food and drink conveying apparatus is capable of restricting the exclusive area and improving the conveyance efficiency while enabling the conveyance of the large and small dishes or trays having the various sizes.

BRIEF DESCRIPTION OF THE DRAWINGS

FIG. 4A is a first diagram illustrating states of conveying foods and drinks.

FIG. 4B is a second diagram illustrating states of conveying foods and drinks.

MODE FOR CARRYING OUT THE INVENTION

An embodiment of the invention of the present application will hereinafter be described. The embodiment to be illustrated below is one aspect of the invention of the present application but does not limit in any way the technical scope of the invention of the present application. The embodiment and a modified example, which will hereinafter be illustrated, are suited to restaurants for serving a variety of foods and drinks instanced by sushi, beverages, bowls of wheat flour noodles and other equivalent noodles, deep-fried chickens, deep-fired fishes and vegetables, Chinese soup noodles, and grilled pieces of meat.

Figure 1:
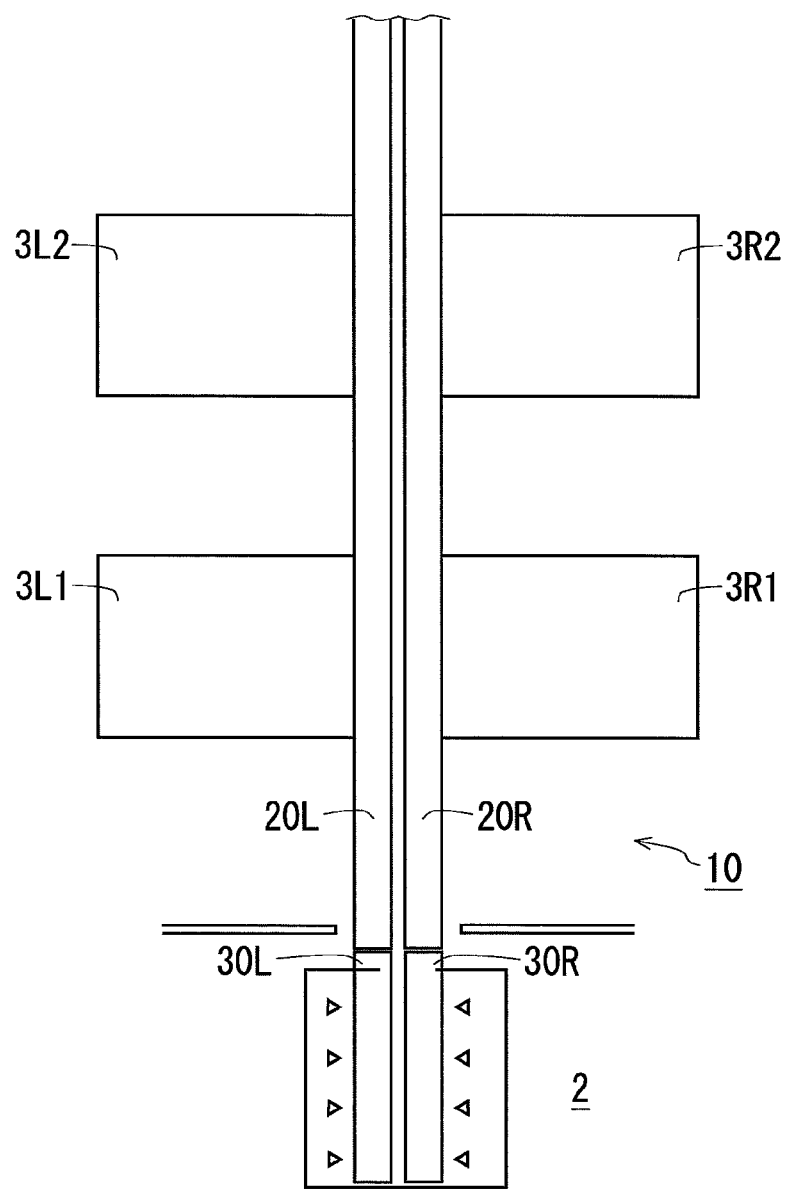
FIG. 1 is a diagram of a whole configuration of an ordered food and drink conveying apparatus according to an embodiment.

FIG. 1 is a diagram of a whole configuration of an ordered food and drink conveying apparatus according to the embodiment. An ordered food and drink conveying apparatus 10 is an apparatus configured to convey dishes of foods and drinks prepared upon receiving ordered from customers to tables 3L1, 3L2, 3R1, 3R2 from a kitchen 2 of a restaurant, and forms, as illustrated in FIG. 1, a conveying path passing aside of the respective tables 3L1, 3L2, 3R1, 3R2 at which customers sit to eat and drink. The ordered food and drink conveying apparatus 10 includes main belt conveyors 20L, 20R forming a conveying path leading to the tables 3L1, 3L2, 3R1, 3R2 from a side of the kitchen 2 of the restaurant, and auxiliary belt conveyors 30L, 30R provided in extension from the main belt conveyors 20L, 20R on the side of the kitchen 2 to elongate the conveying path. Note that the main belt conveyors 20L, 20R are rectilinearly shaped in the present embodiment, and, however, a plurality of main belt conveyors 20L, 20R may also be combined to form a conveying path including corner areas.

The main belt conveyors 20L, 20R are respectively provided with drive motors capable of controlling rotations independently of each other. The auxiliary belt conveyors 30L, 30R are also respectively provided with the drive motors capable of controlling the rotations independently of each other. The respective drive motors are connected to an unillustrated controller, and are controlled based on operation contents inputted to an operation panel and signals given from respective sensors. Operations of the ordered food and drink conveying apparatus 10, which are attained by the controller, will hereinafter be described.

Figure 2A:
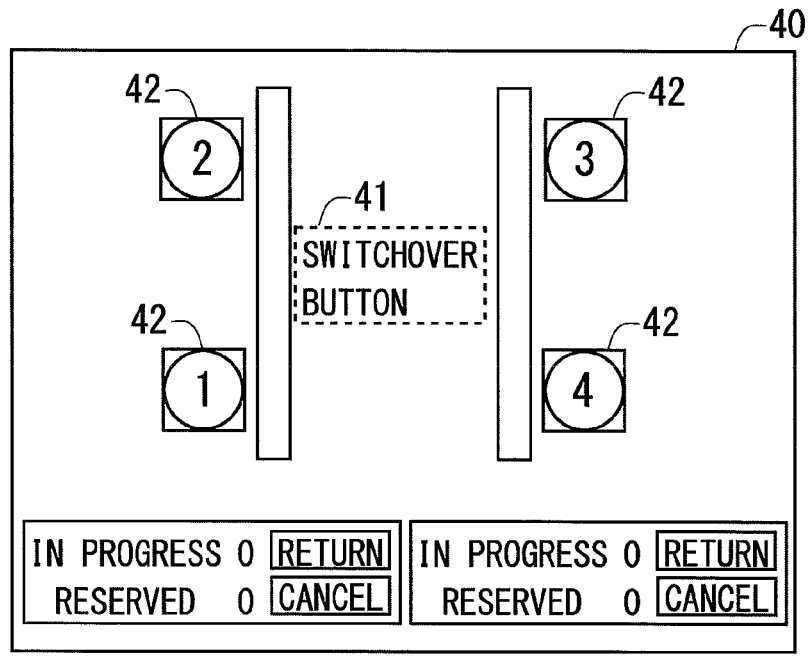
FIG. 2A is a first diagram illustrating screens displayed on an operation panel.
Figure 2B:
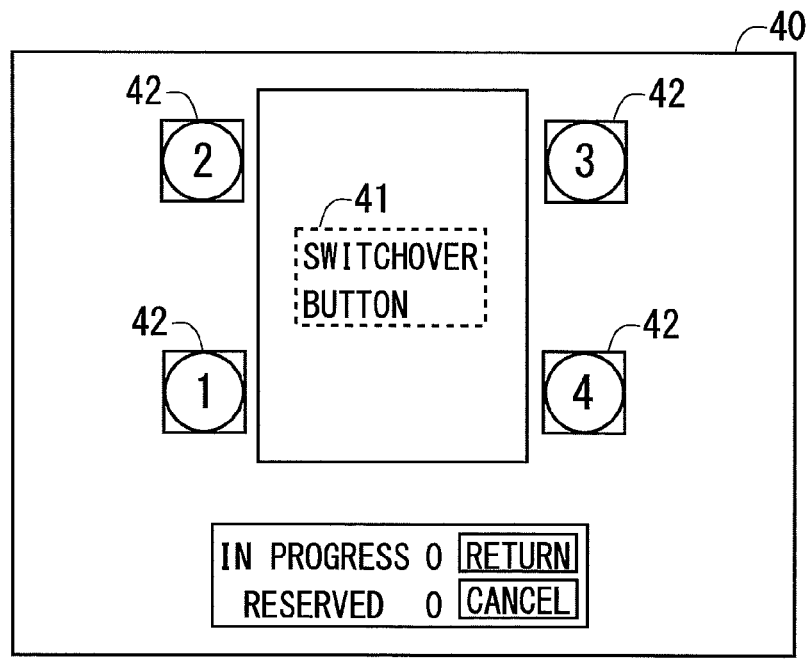
FIG. 2B is a second diagram illustrating screens displayed on an operation panel.
Figure 3:
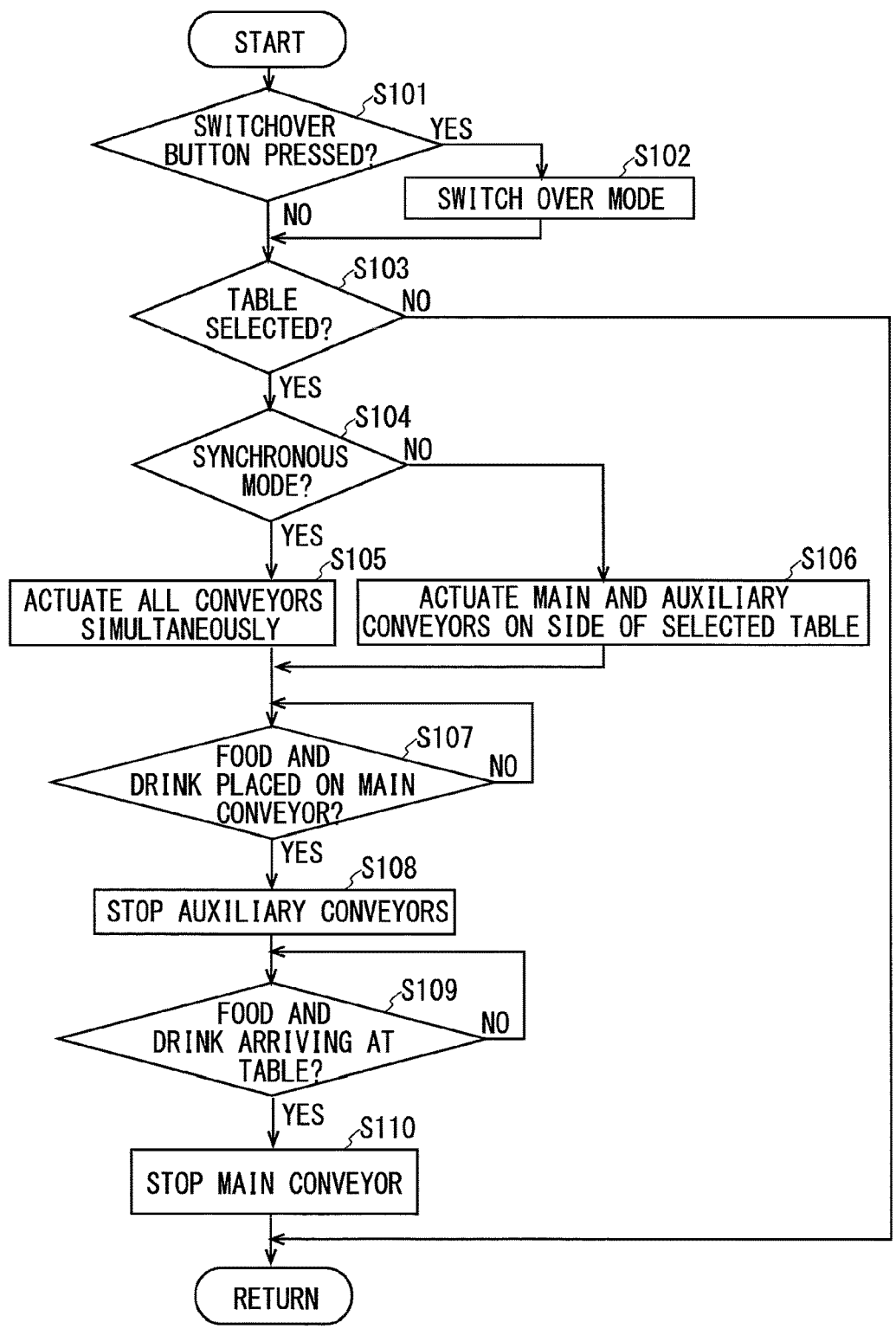
FIG. 3 is a flowchart of contents of control carried out by a controller for the ordered food and drink conveying apparatus.

The controller for the ordered food and drink conveying apparatus 10, upon performing a conveyance starting operation on the operation panel, operates the auxiliary belt conveyors 30L, 30R and the main belt conveyors 20L, 20R, thereby conveying the foods and the drinks to the tables 3L1, 3L2, 3R1, 3R2 from the kitchen 2. FIG. 2A is a first diagram illustrating screens displayed on the operation panel. FIG. 2B is a second diagram illustrating screens displayed on an operation panel. FIG. 3 is a flowchart of contents of control carried out by the controller for the ordered food and drink conveying apparatus 10.

The controller for the ordered food and drink conveying apparatus 10 determines whether a switchover button 41 of a conveying method is pressed against an operation panel 40 (S101). The controller, when making an affirmative determination in step S101, executes a switchover process to a conveyance mode (S102). To be specific, the controller changes a setting value of the conveyance mode, which is stored in a self-memory of the controller. An operation screen corresponding to a setting state of the conveyance mode is displayed on the operation panel 40. For example, when the conveyance mode is an "asynchronous mode", as illustrated in FIG. 2A, such an illustration is displayed that the conveyors are separated into two lines, i.e., a right-side line and a left-side line; and, when the conveyance mode is a "synchronous mode", as illustrated in FIG. 2B, an illustration of one line of thick conveyor is displayed. Accordingly, when the controller executes the switchover process of the conveyance mode in step S102, the display screen of the operation panel 40 is switched over.

The controller makes a negative determination in step S101, or, when executing the process in step S102, determines whether a table selection button 42 is pressed against the operation panel 40 (S103). The controller, when making the negative determination in the process of step S103, executes processes again in step S101 but omits a series of processes from step S104 to step S110. The controller, when making the affirmative determination in the process of step S103, determines whether the currently selected conveyance mode is the "synchronous mode" (S104). Specifically, the controller refers to the setting value of the conveyance mode, which is stored in the self-memory of the controller.

The controller, when making the affirmative determination in the process of step S104, actuates all the conveyors, i.e., the main belt conveyors 20L, 20R and the auxiliary belt conveyors 30L, 30R (S105). Whereas when making the negative determination in the process of step S104, the controller actuates the conveyors on the side of the selected table (S106). For example, the selection button 42 corresponding to the table 3L1 or 3L2 is selected in a state of the "asynchronous mode" being selected, in which case the controller actuates the main belt conveyor 20L and the auxiliary belt conveyor 30L in a process of step S106. Further, for instance, the selection button 42 corresponding to the table 3R1 or 3R2 is selected in the state of the "asynchronous mode" being selected, in which case the controller actuates the main belt conveyor 20R and the auxiliary belt conveyor 30R in the process of step S106.

Note that the controller may change speeds of the main belt conveyors 20L, 20R and the auxiliary belt conveyors 30L, 30R, corresponding to the selected conveyance mode. In the "synchronous mode" selected when conveying a relatively large conveyance object straddling the two conveyors arranged in a side-by-side relationship, the controller may also set the speeds of the conveyors slower than in the "asynchronous mode" selected when conveying a relatively small conveyance object.

The controller determines, after executing the process of step S105 or S106, whether the foods and drinks placed so far on the actuated auxiliary belt conveyors 30L, 30R are then placed on the main belt conveyors 20L, 20R (S107). The controller may also determine whether the foods and drinks placed so far on the actuated auxiliary belt conveyors 30L, 30R are then placed on the main belt conveyors 20L, 20R, based on, e.g., detection results of sensors installed in the vicinities of boundaries between the auxiliary belt conveyors 30L, 30R and the main belt conveyors 20L, 20R, or based on an elapse time since having actuated the auxiliary belt conveyors 30L, 30R. The controller, when making the affirmative determination in the process of step S107, stops the auxiliary belt conveyors 30L, 30R (S108). With the auxiliary belt conveyors 30L, 30R being stopped, even when the foods and the drinks are in the process of conveyance by the main belt conveyors 20L, 20R, the foods and the drinks desired to be conveyed next may be placed on the auxiliary belt conveyors 30L, 30R.

The controller determines, after executing the process of step S108, whether the foods and the drinks placed on the main belt conveyors 20L, 20R arrive at the tables 3L1, 3L2, 3R1, 3R2 (S109). The controller may determine whether the foods and the drinks arrive thereat, based on detection results of sensors installed in the vicinities of, e.g., the conveying target tables 3L1, 3L2, 3R1, 3R2, or based on an elapse time since starting the conveyance, the elapse time being preset per position of the conveying target tables 3L1, 3L2, 3R1, 3R2. The controller stops the main belt conveyors 20L, 20R when making the affirmative determination in the process of step S109 (S110).

Note that the "conveyors" are designated by the reference symbols "20L, 20R" or "30L, 30R" in the description of steps S107 through S110, and the conveyors to be stopped in steps S108, S110 are, however, any one or both of the conveyors designated by "20L, 20R" corresponding to the conveyance mode remaining selected by the selection button 42, and any one or both of the conveyors designated by "30L, 30R". The same is applied to the conveying target table that is any one of the tables 3L1, 3L2, 3R1, 3R2.

FIG. 4A is a first diagram illustrating states of conveying the foods and the drinks. FIG. 4B is a second diagram illustrating states of conveying foods and drinks. For example, when desiring to convey the food and the drink on a small dish 1S conveyable by any one of the main belt conveyors 20L, 20R, a staff member existing in the kitchen 2, after selecting the "asynchronous mode" on the operation panel 40 or confirming that the "asynchronous mode" has been selected, places the dish 1S on the belt conveyor 30L (or the auxiliary belt conveyor 30R) and presses the selection button 42, at which time the dish 1S served with the food and the drink is, as illustrated in FIG. 4A, conveyed to any one of the tables 3L1, 3L2, 3R1, 3R2 while being placed on the auxiliary belt conveyor 30L (or the auxiliary belt conveyor 30R) and the main belt conveyor 20L (or the main belt conveyor 20R). For example, when desiring to convey the foods and the drinks on a tray 1L having a size large enough to straddle both of the main belt conveyors 20L, 20R, the staff member existing in the kitchen 2, after selecting the "synchronous mode" on the operation panel 40 or confirming that the "synchronous mode" has been selected, places the tray 1L on the auxiliary belt conveyors 30L, 30R and presses the selection button 42, at which time the tray 1L served with the foods and the drinks is, as illustrated in FIG. 4B, conveyed to any one of the tables 3L1, 3L2, 3R1, 3R2 while being placed on the auxiliary belt conveyors 30L, 30R and the main belt conveyors 20L, 20R.

The ordered food and drink conveying apparatus 10 according to the embodiment is, as described above, enabled to synchronize the main belt conveyors 20L, 20R arranged in the side-by-side relationship or to asynchronously operate these conveyors independently of each other. Hence, when conveying, e.g., the dishes 1S as the relatively small conveying objects, it is feasible to simultaneously convey the foods and the drinks to any one of the tables 3L1, 3L2 and any one of the tables 3R1, 3R2 by asynchronously operating the main belt conveyors 20L, 20R independently of each other. When conveying the tray 1L as the relatively large conveying object, it is also feasible to convey the tray 1L having the size large enough not to be conveyed by only any one of the main belt conveyors 20L, 20R by simultaneously operating the main belt conveyors 20L, 20R so as to synchronize motions of these conveyors.

The ordered food and drink conveying apparatus 10 according to the embodiment is enabled to convey the tray 1L larger than the breadth of the single conveyor without being equipped with the single conveyor having the breadth large enough to allow the placement of the tray 1L, and hence it is feasible to restrict an area occupied by the conveying apparatus within a limited space of store, and high conveyance efficiency is obtained because the conveyors arranged in two lines are usable simultaneously when conveying the relatively small dishes 1S.

Note that in the ordered food and drink conveying apparatus 10 according to the embodiment, one line of conveying path is configured by the two conveyors, i.e., the main belt conveyor 20L (20R) and the auxiliary belt conveyor 30L (30R), and each conveying path may be, however, configured by one conveyor and may also be configured by three or more conveyors in series.

In the ordered food and drink conveying apparatus 10 according to the embodiment, the conveyance mode is switched over by the switchover button 41, and may also be automatically switched over based on a sensor for identifying whether the conveying object is placed in a way that straddles the conveyors arranged in two lines; and there may be added a function to prevent an erroneous operation of an operator by using the sensor and the switchover button 41 in combination.

The sensor for identifying whether the conveying object is placed in a way that straddles the conveyors arranged in two lines is exemplified by a non-contact type sensor instanced by an ultrasonic sensor and an optical sensor capable of identifying differences between shapes and sizes of the conveying objects, a contact type sensor for detecting a physical contact or non-contact with the conveying object, a variety of information reading means instanced by an RFID (Radio Frequency Identifier) for identifying the conveying object by reading identification information attached to the conveying object, an image analyzing device for discriminating between types of the conveying objects by analyzing images of the conveying objects, which are acquired from an image capturing device, a weight sensor for measuring a weight of the conveying object placed on the conveyor, and other various types of sensors.

Figure 5A:
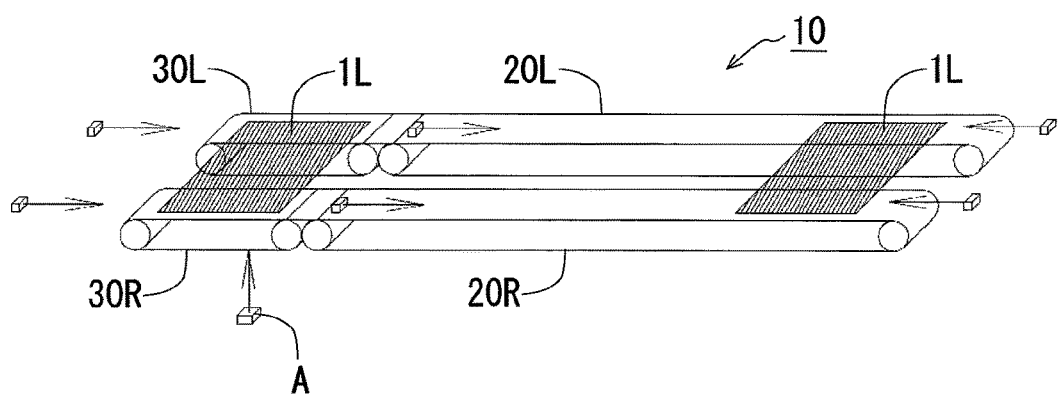
FIG. 5A is a first diagram illustrating positions of fitting sensors.
Figure 5B:
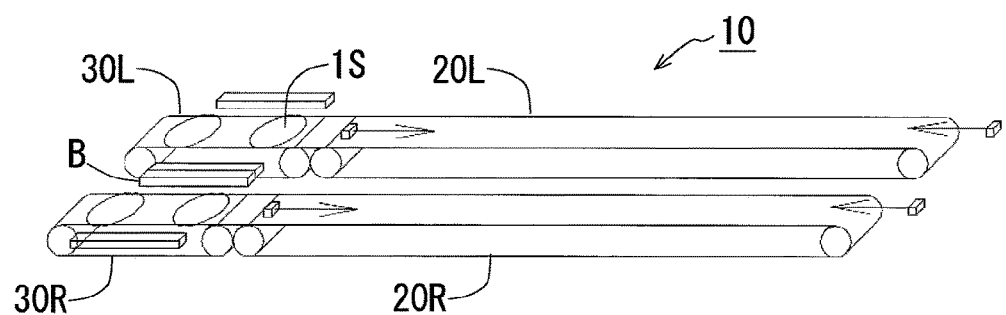
FIG. 5B is a second diagram illustrating positions of fitting sensors.
Figure 5C:
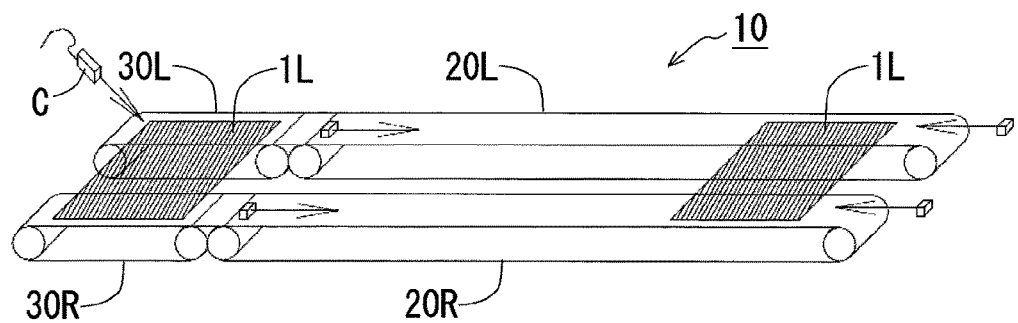
FIG. 5C is a third diagram illustrating positions of fitting sensors.

FIG. 5A is a first diagram illustrating positions of fitting the sensors. FIG. 5B is a second diagram illustrating positions of fitting sensors. FIG. 5C is a third diagram illustrating positions of fitting sensors. When the RFID or the non-contact sensor is used as the sensor for identifying whether the conveying object is placed so as to straddle the 2-line conveyors, as indicated by a reference symbol A in, e.g., FIG. 5A, the sensor is disposed between the auxiliary belt conveyors 30L, 30R and is thereby enabled to identify whether the tray 1L straddles the auxiliary belt conveyors 30L, 30R.

When the contact sensor is used as the sensor for identifying whether the conveying object is placed so as to straddle the 2-line conveyors, as indicated by a reference symbol B in, e.g., FIG. 5B, the sensor is provided so that a contact portion protrudes above a conveying surface of the conveyor from between the auxiliary belt conveyors 30L, 30R, thereby making it feasible to identify whether the tray 1L straddles the auxiliary belt conveyors 30L, 30R. Note that FIG. 5B illustrates a state of how light emitting/receiving units for area sensors are disposed so as to interpose the auxiliary belt conveyors 30L, 30R from both sides on the assumption that the sensors concerned serve also as optical area sensors for detecting the dishes 1S.

The image analyzing device for discriminating between the types of the conveying objects by analyzing the images of the conveying objects is used as the sensor for identifying whether the conveying object is placed so as to straddle the 2-line conveyors, in which case the image capturing device is, as indicated by a reference symbol C in, e.g., FIG. 5C, provided in such a position as overlooking the auxiliary belt conveyors 30L, 30R from above, whereby the conveying object placed on the auxiliary belt conveyors 30L, 30R is distinguishable from the dish 1S or the tray 1L.

DESCRIPTION OF THE REFERENCE NUMERALS AND SYMBOLS

1S . . . dish
1L . . . tray
2 . . . kitchen
3L1, 3L2, 3R1, 3R2 . . . table
10 . . . ordered food and drink conveying apparatus
20L, 20R . . . main belt conveyors
30L, 30R . . . auxiliary belt conveyors
40 . . . operation panel
41 . . . switchover button
42 . . . selection button

The invention claimed is:

1. An ordered food and drink conveying apparatus comprising:
   a plurality of conveyors being arranged in a side-by-side relationship and conveying foods and drinks to customer seats from a kitchen; and
   a controller controlling motions of the plurality of conveyors, synchronizing the motions of the plurality of conveyors in a first mode selected when there are foods and drinks being so placed as to straddle the plurality of conveyors, and asynchronizing the motions of the plurality of conveyors in a second mode selected when there are none of the foods and the drinks being so placed as to straddle the plurality of conveyors, wherein:
   the controller controls the motions of the plurality of conveyors, based on any one of the first mode and the second mode selected corresponding to outputs of sensors detecting placement states of the foods and the drinks being placed on the plurality of conveyors,
   the sensors detect existence or non-existence of objects straddling the plurality of conveyors, and
   the controller controls the motions of the plurality of conveyors, based on the first mode, when the sensors detect the objects straddling the plurality of conveyors, and controls the motions of the plurality of conveyors, based on the second mode, when the sensors detect none of the objects straddling the plurality of conveyors.

2. The ordered food and drink conveying apparatus according to claim 1, wherein the controller controls the motions of the plurality of conveyors, based on any one of the first mode and the second mode selected via an operation means installed at a kitchen.

* * * * *